United States Patent Office 3,224,932
Patented Dec. 21, 1965

3,224,932
BIS(DIISOPROPYLTHIOCARBAMOYL)SULFIDE
AS A FUNGICIDE
Bert Lorin Richards, Jr., Wilmington, Del., assignor to
E. I. du Pont de Nemours and Company, Wilmington,
Del., a corporation of Delaware
No Drawing. Filed June 7, 1963, Ser. No. 286,192
2 Claims. (Cl. 167—22)

This invention relates to the use of thiuram monosulfide for controlling fungi.

More specifically this invention refers to the use of bis(diisopropylthiocarbamoyl)sufide for controlling fungi of the order Erysiphales.

The Erysiphales or powdery mildew fungi are obligate parasites of higher plants. Powdery mildew spores are disseminated readily by air. Consequently, they spread rapidly and result in destructive diseases in a great variety of cultivated plants throughout the world. Powdery mildew infection is found in such crops as grapes, hops, gooseberries, roses and other ornamentals, clovers, apples, cucumber, cantaloupe, watermelon and cereal plants. Although there are only about fifty species of fungi within this order, the number of plants affected total more than one hundred and fifty species.

In view of the frequency of powdery mildew infection throughout the higher plant world, I have sought to find a compound that will control these particular fungi and at the same time avoid phytotoxicity to the crop plant.

I have found a compound, bis(diisopropylthiocarbamoyl)sulfide, which not only prevents the growth of powdery mildew on living plant tissue but, even more importantly, exhibits a curative effect. I have noted no phytotoxicity toward living plant tissue at rates substantially higher than required for effective control of powdery mildew.

PREPARATION

Bis(diisopropylthiocarbamoyl)sulfide can be prepared from sodium diisopropyldithiocarbamate as shown below.

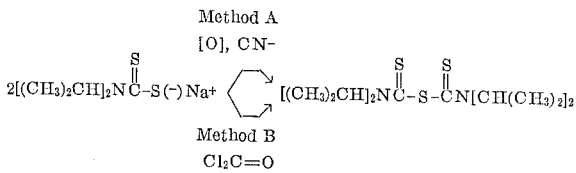

Both Method A, oxidation of the dithiocarbamate to the disulfide followed by desulfurization with a cyanide salt, and Method B, reaction of the dithiocarbamate with phosgene, produce satisfactory yields of the active compound used in my ivention. In Method A, oxidizing agents such as chlorine, hydrogen peroxide and persulfate salts can be employed. In Method B, phosgene produces an intermediate mixed anhydride having the structure:

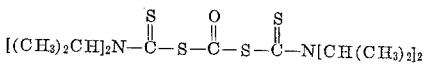

This intermediate has only transient stability, rapidly eliminating carbon oxysulfide and the product bis(diisopropylthiocarbamoyl)sulfide. This compound is a bright yellow crystalline solid having a melting point of 117–118° C. It can be easily recrystallized from ethanol. This compound is chemically stable and is easily handled during manufacture ad formulation as an agricultural chemical.

A particularly interesting aspect of the performance of the aforementioned compound is that it can be applied up to three or more days after infection of plant tissue by a powdery mildew organism. The growth of the fungus is immediately stopped and significant damage to the plant foliage is prevented.

The results obtained from the compound used in this invention is markedly different from the results obtained by using common commercial fungicides such as tetramethylthiuram disulfide.

COMPOSITIONS

The fungicidal compositions of this invention comprise bis(diisopropylthiocarbamoyl)sulfide together with one or more surface-active agents. The surface-active agent or surfactant can include any of the anionic, cationic and non-ionic surface-active agents. Suitable surface-active agents are set out, for example, in Searle U.S. Patent 2,426,417; Todd U.S. Patent 2,655,447; Jones U.S. Patent 2,412,510; or Lenher U.S. Patent 2,139,276. A detailed list of such agents is set forth in "Detergents and Emulsifiers–Up to Date" (1962) by John W. McCutcheon, Inc., and Bulletin E–607 of the Bureau of Entomology and Plant Quarantine of the U.S. Department of Agriculture.

Among the more preferred surfactants are those anionic and non-ionic agents recognized in the art as wetting agents, dispersing agents, detergents or emulsifiers. Among the anionic surfactants, preferred ones are alkali metal or amine salts of alkylbenzenesulfonic acids such as dodecylbenzenesulfonic acid, alkali metal or amine salts of sulfated alcohols such as sodium lauryl sulfate, alkali metal or amine salts of alkylnaphthalene sulfonates, sodium N-methyl-N-oleoyltuarate, oleic acid ester of sodium isethionate, dialkyl esters of sodium sulfosuccinic acid such as dioctyl sodium sulfosuccinate, and sodium dodecyldiphenyl oxide disulfonate. Among the non-ionic compounds, preferred members include alkylphenoxy poly(ethyleneoxy)ethanols such as nonylphenol adducts with ethylene oxide; trimethylnonyl polyethylene glycol ethers, polyethylene oxide adducts with fatty and rosin acids, ethylene oxide adducts with sorbitan fatty acid esters, and long chain alcohol or mercaptan adducts with ethylene oxide.

Among preferred surfactants are also dispersants such as methyl cellulose, polyvinyl alcohol, sodium lignin sulfonates, polymeric alkylnaphthalene sulfonates, and polymethylene bis sulfonates.

Surfactants can be present in compositions of this invention in the range of 0.1 to 20% by weight. However, in some instances even greater proportions of surfactants can be used.

Liquid compositions containing 1 to 50% by weight of bis(diisopropylthiocarbamoyl)sulfide can contain, with or without surfactant present, common liquid carriers such as alcohols, ketones, chlorinated hydrocarbons, ethylene glycol monoalkyl ethers, aliphatic and aromatic hydrocarbons and N,N-dialkyl amides. Preferred liquid solvents include kerosene, Stoddard solvent, xylene, alkylated naphthalenes, cyclohexane, cyclohexanone, chloroethanes, ethylene glycol monoethyl ether and dimethylformamide. Substantially non-aromatic hydrocarbon oils having a low sulfonatable content, i.e., the so-called fungicidal spray oils having at least 90% by weight unsulfonatable residue, can also be used as carriers. These compositions containing one or more of the above-mentioned carriers can often be used by direct application to the plant, although in the more usual case the liquid composition is extended with additional carriers, for example by emulsification in water.

In preferred liquid compositions, the bis(diisopropylthiocarbamoyl)sulfide can be formulated into emulsifiable solutions containing 10 to 50% by weight of active plus solvent and emulsifiers to make up 100%. The solvents can be water insoluble. Typical of the solvents used are higher ketones, higher aliphatic and aromatic hydrocarbons, chlorinated hydrocarbons and the like. Preferably, alkylated naphthalene, xylene, isophorone, monochlorobenzene or cyclohexanone alone or in combination is used.

Another preferred class of compositions are the aqueous suspension concentrates described in U.S. Patent 3,060,084.

The preferred emulsifiable solutions and aqueous suspension concentrates are very desirable because of their convenience in handling and use, and because of their superior control of the powdery mildew organism.

Additional compositions can be formulated by adding a free-flowing inert powder to the active agents.

The free-flowing inert powders can be any of the extenders commonly employed in the fungicide art. They can include inert finely divided diluents such as natural clays including attapulgite or kaolinite, diatomaceous earth, pyrophyllite, talc, synthetic mineral fillers derived from silica and silicates such as synthetic fine silica and synthetic calcium or magnesium silicate, carbonates, phosphates and sulfates, sulfur, lime and flours such as wood, walnut shell, redwood, soybeans and cottonseed.

Dust compositions contain 1 to 30% by weight of the active ingredient. However, 3 to 15% by weight is preferred.

Particle size of the extender can vary considerably but will ordinarily be somewhat under 50 microns in the finished formulation.

In wettable powder compositions containing the active ingredient, one or more surfactants, and a finely divided inert diluent as described above, the active compound ordinarily will be present in a concentration in the range of 25 to 85% by weight. Surfactants will be present in a range from 0.1 to 10% by weight to obtain adequate wetting and dispersion in water, with the remainder being largely one or more of the finely divided diluents shown above.

Wettable powders are prepared by mixing the ingredients in a blender and grinding the mixture in a hammer mill, air impact mill or the like until the particle size has been reduced to make spray application practical and easy.

Wettable powders and liquid compositions are frequently used by dilution and extension with water to form spray slurry compositions containing from 0.05% to 3% of the active ingredient.

Compositions of this invention can additionally contain other fungicides in order to control a broader spectrum of fungi. Illustrative of some of these fungicides are:

Metal salts of ethylene bisdithiocarbamic acid, e.g. manganese, zinc, iron and sodium salts;
Ethylene thiuram monsulfide;
Dodecylguanidine acetate;
N-trichloromethylthio tetrahydrophthalimide (Captan;
Phenylmercury acetate;
2,4 - dichloro-6-(o-chloroanilino)-s-triazine N - methylmercury-p-toluenesulfonanilide;
Methyl mercury acetate;
Methyl mercury 2,3-dihydroxypropyl mercaptide;
3,3' - ethylenebis(tetrahydro-4,6-dimethyl-2H-1,3,5-thiadiazine-2-thione);
Methyl mercury dicyandiamide;
N-ethylmercury-p-toluenesulfonanilide;
Metal (e.g. iron, sodium, and zinc), ammonium and amine salts of dialkyldithiocarbamic acids, for instance ziram and ferbam;
Copper-8-quinolinate;
Copper dihydrazinium sulfate;
2-heptadecylglyoxalidine acetate;
Tetra copper calcium oxychloride;
Methylmercury nitrile;
2,3-dichloro-1,4-naphthoquinone;
Tetrachloroquinone; and
N-trichloromethylthiophthalimide ("Phaltan")

The above fungicides are added to compositions containing the active ingredient used in this invention at the rate of 1 to 400 pounds to each 20 pounds of bis(diisopropylthiocarbamoyl)sulfide. Fungicides used at low rates with the active ingredient of this case are, for example, manganese or zinc ethylene bis(dithiocarbamate). Illustrative of a fungicide used at high rates with the active ingredient of this case is captan. Of course, more or less of the above-listed fungicides can be added to a composition of this invention depending on the fungi present in the area to be protected.

Compositions of this invention can additionally contain insecticides such as:

O,O-dimethyl-S-4-oxo-1,2,3-benzotriazin-3-(4H)-ylmethyl phosphorodithioate (Guthion®),
Rotenone,
S-[1,2-bis(ethoxycarbonyl)ethyl]O,O-dimethylphosphorodithioate (malathion),
O,O-diethyl-O-p-nitrophenyl phosphorothioate (parathion)
1-naphthyl-N-methylcarbamate ("Sevin"®), Lindane,
O,O-diethyl-O-(2-isopropyl-4-methyl-6-pyrimidyl) phosphorothioate ("Diazinon"®),
4,4'-dichloro-α-trichloromethylbenzhydrol ("Kelthane"®),
Nicotine,
Lead arsenate,
DDT,
Methoxychloro, and others for simultaneous control of insects and fungi on plants.

From 0.1 to 10 parts by weight of the insecticide is used for each one part by weight of bis(diisopropylthiocarbamoyl)sulfide.

Insecticides can be combined with bis(diisopropylthiocarbamoyl)sulfide in emulsifiable compositions by dissolving the insecticide and the bis(diisopropylthiocarbamoyl)sulfide in an inert solvent containing an emulsifier. These compositions are emulsified in water and applied to the plants much like the wettable powders above.

In addition compositions can contain special additives such as corrosion inhibitors, pigments, antifoam agents and the like.

APPLICATION

Bis(diisopropylthiocarbamoyl)sulfide used in this invention is sprayed or dusted to give complete coverage of the plant tissue which is to be protected. By applying bis(diisopropylthiocarbamoyl)sulfide before the infection is noted or anytime up to three days after infection has begun, adequate control of powdery mildew is obtained without any toxic effect on the plant itself. The bis(diisopropylthiocarbamoyl)sulfide is applied at the rate of 0.1 to 10 pounds per 100 gallons of spray mixture. Dusts will be applied at the rate of 0.1 to 10 pounds of active per acre.

Applications can be made with any conventional spray or dust equipment well known in the art.

In addition to the examples set forth above, the following examples are provided to more clearly describe this invention. All percentages are by weight unless otherwise indicated.

Example 1

In a stirred vessel fitted with an efficient condenser, 100 parts by volume of 1 N sodium hydroxide, 10.0 parts by weight of diisopropylamine and 7.6 parts by weight of carbon disulfide are combined and stirred for 2.5 hours. The diisopropyldithiocarbamate which forms exothermically is not isolated. Sodium cyanide (15 parts by weight) is added all at once. Ammonium persulfate, 22.8 parts by weight dissolved in 100 parts by volume of water, is then added with stirring and cooling. The mixture may stand overnight if desired. The product is filtered and recrystallized from 3 to 4 parts of ethanol to yield bis(diisopropylthiocarbamoyl)sulfide, M.P. 117.5 to 118.5° C. Calcd. for $C_{14}H_{28}N_2S_3$: C, 52.5; H, 8.80; N, 8.74; S, 30.0 Found: C, 52.97; H, 8.98 N, 8.83; S, 29.8.

The following formulation is prepared by intimately blending the ingredients and grinding the blend in an air attrition mill until the particle size is substantially less than 5 microns.

|  | Percent |
|---|---|
| Bis(diisopropylthiocarbamoyl)sulfide | 50.0 |
| Partially desulfonated sodium lignin sulfonate | 3.0 |
| Dioctyl ester of sodium sulfosuccinate | 3.0 |
| Kaolin clay | 44.0 |

The above 50% wettable powder formulation, dispersed in water to give an active ingredient concentration of 0.04% to 0.3% by weight is sprayed on cucumber foliage following a regular commercial schedule. Good control of cucumber powdery mildew (*Erysiphe cichoracearum* DC) and increased crop yields result.

Example 2

To a well-stirred solution of 101 parts by weight of diisopropylamine and 202 parts by weight of water in a reaction vessel fitted with a highly efficient condenser is added 76 parts by weight of carbon disulfide at 25 to 35° C. Cooling is needed during the first half of the addition. A solution of 40 parts by weight of sodium hydroxide dissolved in 48 parts by weight of water is then added to the slurry, maintaining the reaction below 43° C. by ice-cooling and regulation of the rate of addition. The reaction at first becomes clear; then a precipitate appears. By the end of the addition a thick slurry has formed which is stirred until it reaches room temperature. After filtration, the precipitate is dried for 24 hours under a slow nitrogen stream at 45° C. and about 90 mm. pressure absolute to yield 179 parts (71%) of sodium diisopropyldithiocarbamate, trihydrate. Calcd. for $C_{17}H_{14}NS_2Na \cdot 3H_2O$: $H_2O$, 21.3; S, 25.3. Found: $H_2O$, 22.7; S, 25.5.

Additional salt remains, of course, in the mother liquor and it can be isolated if desired. Alternatively the mother liquor might be recycled. Since there is a trace of excess caustic in the dried salt, a solution of 200 parts by weight in 2000 parts of water shows pH 11.2. This is reduced to 9.4 by addition of 3⅓ parts by volume of concentrated hydrochloric acid. Over a period of about 2 hours, 50 parts by weight (25% excess) of phosgene is passed into the solution with stirring and very moderate cooling to maintain the temperature at 22 to 25° C. The mixture is stirred for one hour and the product filtered. (The pH of the mother liquor is 9.6.) After drying, 91 parts by weight (72%) of bis(diisopropylthiocarbamoyl)sulfide, M.P. 117–118.5° C. remains. Further treatment of the mother liquor with 17 parts by weight of phosgene yields an addition 24 parts by weight (19%) of product, M.P. 117–118.5° C. The total yield therefore is about 91% of theory based on dithiocarbamate charged.

The following emulsifiable concentrate is prepared by charging the active ingredient, the emulsifier and the xylene to a tank and agitating until solution is complete.

|  | Percent |
|---|---|
| Bis(diisopropylthiocarbamoyl)sulfide | 30 |
| Calcium dodecylbenzenesulfonate blended with nonyl phenol polyethylene oxide condensation product | 6 |
| Xylene | 32 |
| Monochlorobenzene | 32 |

This 25% emulsifiable concentrate formulation, dispersed in water to give 0.04% to 0.25% by weight active ingredient, is sprayed on a commercial planting of apple trees. Applications are made to give complete wetting of the fruit and foliage and repeated on a regular commercial schedule. Excellent control of powdery mildew (*Podosphaera leucotricha*) results.

Example 3

|  | Percent |
|---|---|
| Bis(diisopropylthiocarbamoyl)sulfide | 35 |
| Sodium lignin sulfonate | 5 |
| Hydrated attapulgite clay | 2 |
| Water | 58 |

All of the above ingredients are charged to a sand-grinder as described in detail, for example, in Hochberg U.S. Patent 2,581,414 and milled and ground until the particle size is substantially less than 5 microns.

The above formulation, a 35% aqueous suspension, is sprayed weekly at 0.04% to 0.25% by weight active ingredient on the foliage of roses until the leaves are wet. A great number of beautiful blooms is obtained by control of powdery mildew (*Sphaerotheca paunosa*, var. *rosae*) on the leaves, stems and susceptible floral parts of the plants.

Example 4

A practical field evaluation is conducted by selecting for the test a group of apple trees of the Rome variety which have a history of regular heavy infection by the powdery mildew organism, *Podosphaera leucotricha*. The presence of the active disease organism is confirmed early in the spring by the observance of numerous terminal buds which are abnormally swollen and have loosened scales. The available trees are designated randomly from one to four so that there is finally an equal number of trees with each designation. A different treatment is applied to the trees of each designation. The treatments included in the test are as follows:

| Tree Designation | Material | Use Rate in Pounds Active Per 100 Gallons of Spray Water |
|---|---|---|
| 1 | Bis(diisopropylthiocarbamoyl) sulfide | 0.5 |
| 2 | do | 1.0 |
| 3 | do | 2.0 |
| 4 | Untreated control |  |

The field applications are started in the spring when the most-advanced buds have ¼ to ½ inch of green leaf showing. The trees are sprayed with the formulation of Example 3 until the branches, twigs and foliage are wetted to the point of run-off. Applications are repeated weekly until mid-June and thereafter at intervals of two weeks until the end of August.

In early September the untreated control tree shows a serious infection with powdery mildew. Many of the leaves are dead, twisted or stunted. Many terminal shoots have been killed or badly damaged. Much of the fruit is abnormally small. Much of the foliage is covered with a white powdery coating of fungus growth. All of the trees treated with bis(diisopropylthiocarbamoyl)sulfide are completely normal in all regards. Foliage is clean and healthy, twig growth is good and the fruit is of good size. Apple scab (*Venturia inequalis*) and apple cedar rust (*Gymnosporangium juniperi-virgenianae*) that are present on the untreated trees are also effectively controlled by the above treatment.

I claim:
1. A method for controlling the growth of fungi of the order Erysiphales comprising applying to living plant tissue a fungicidal amount of bis(diisopropylthiocarbamoyl)sulfide.
2. A method for controlling the growth of fungi of the order Erysiphales comprising applying to said fungi a fungicidal amount of bis(diisopropylthiocarbamoyl)sulfide.

References Cited by the Examiner

UNITED STATES PATENTS 2,937,147   5/1960   Goldwasser _____ 167—22

OTHER REFERENCES

Klopping et al.: Recueil, vol. 70, pages 917 to 939, pages 921 (Compound No. 6) and page 922 (Compound No. 11).

JULIAN S. LEVITT, *Primary Examiner.*